UNITED STATES PATENT OFFICE.

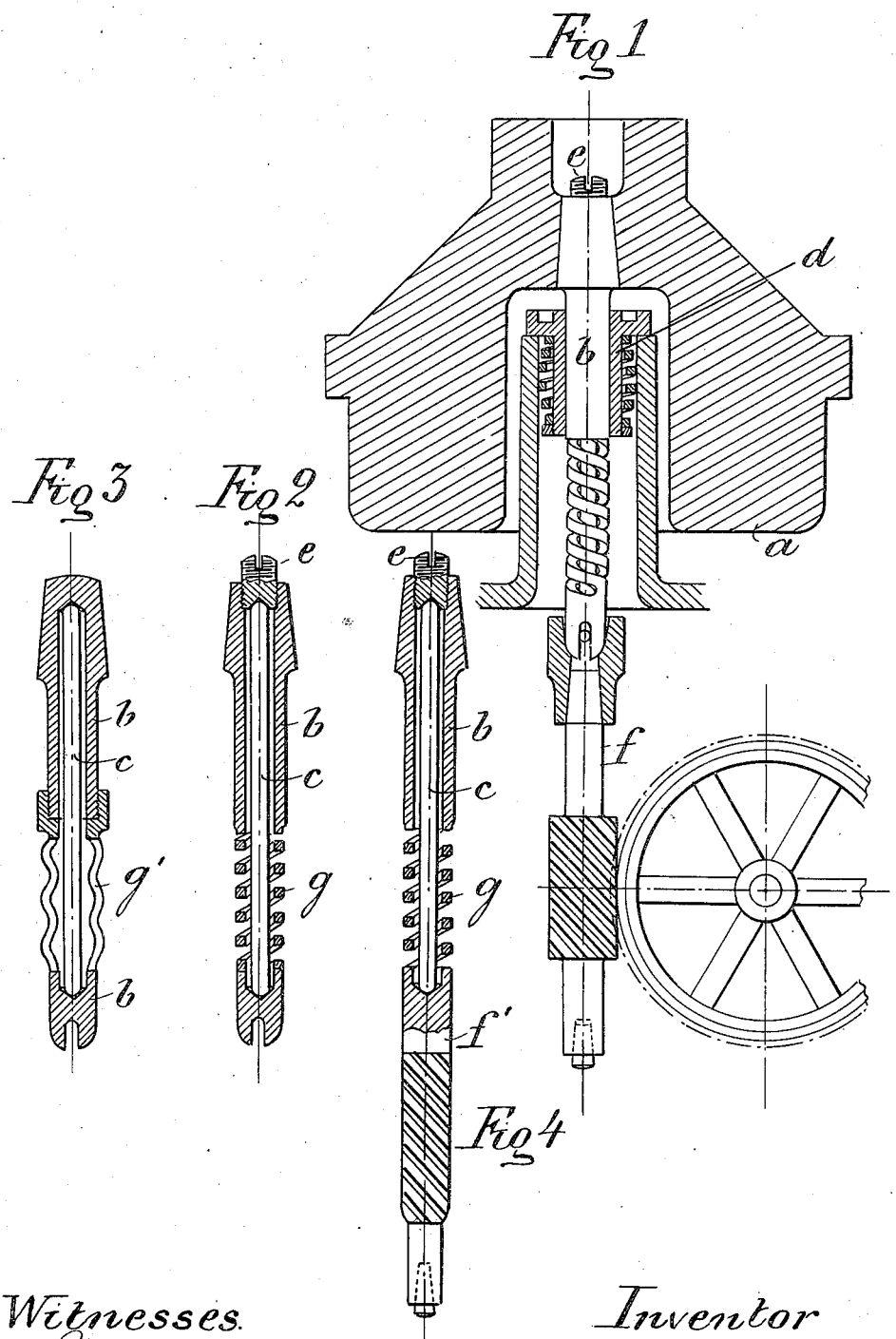

IVAR PETER BAGGER KNUDSEN, OF COPENHAGEN, DENMARK.

FLEXIBLE SPINDLE FOR CENTRIFUGAL MACHINES.

No. 847,009.  Specification of Letters Patent.  Patented March 12, 1907.

Application filed September 24, 1906. Serial No. 336,021.

*To all whom it may concern:*

Be it known that I, IVAR PETER BAGGER KNUDSEN, director, a subject of Denmark, residing at 56 Svanemóllevej, Copenhagen, in the Kingdom of Denmark, have invented new and useful Improvements in Flexible Spindles for Centrifugal Machines, of which the following is a specification.

This invention relates to a flexible spindle for centrifugal drums or vessels and other similar rapidly-rotatable bodies. The spindle is so constructed that the vibrations and oscillations occurring during the rotation will be prevented from causing any appreciable loss of power and from being transmitted to the driving mechanism, so as to act injuriously upon the durability of the latter.

A further distinguishing feature of the invention consists in the fact that notwithstanding its flexibility the length of the spindle remains constant, this property serving to considerably promote steady running on the part of the centrifugal drum.

According to the invention the spindle is made hollow and for a portion of its length is in the form of a helix or is otherwise rendered flexible in said portion, so as to enable it to accommodate itself to the oscillations of the drum and prevent said oscillations being transmitted to the driving-shaft, which is situated below the spindle and connected to the latter either fixedly or loosely. In order to prevent the length of the spindle from becoming altered when bent, there is provided within the spindle a thin rod or the like which is capable of supporting the weight of the centrifugal drum and of withstanding the strains thereby produced.

In the accompanying drawings, which illustrate various forms of the invention, Figure 1 is a partial vertical section through a centrifugal drum provided with one form of the improved spindle, while Figs. 2 and 3 are vertical sections of modified forms of the flexible spindle shown separately. Fig. 4 is a partial vertical section through a flexible spindle which is fixed to the driving-shaft.

In Fig. 1, *a* is the centrifugal drum, formed with an upwardly-extending cavity in the bottom, so that a spring collar-bearing of any desired construction—as indicated, for example, at *d*—may be provided for the spindle *b* of the drum at or above the center of gravity of the latter. The spindle *b*, which is loosely connected to the driving-shaft *f*, by which it may be driven through the medium of any known device, is hollow and is made in the form of a helix throughout that part of its length which is situated below the collar-bearing, with the result that the spindle is rendered flexible at this portion and is thus enabled to follow the movements of the elastic collar-bearing and of the drum (when the latter is caused to vibrate and oscillate during its rotation) without such vibration and oscillation being transmitted to the driving mechanism and to the bearings of the latter.

In order to support the hollow spindle and to prevent alteration of its length when bent, the spindle is provided with a core in the form of a thin rod C or the like, which is capable of supporting the weight of the drum and of withstanding any strains that may be generated. Instead of being in the form of a helix the spindle may also, as shown in Fig. 3, be formed with corrugations, as at *g'*, along a portion of its length, or it may be rendered elastic along a portion of its length by any other means.

The hollow flexible spindle may be closed at the top in one piece or, as shown in Figs. 1, 2, and 4, by means of a plug *e*, which is screwed in after the rod C has been inserted within the spindle, or, as shown in Fig. 3, the spindle may be composed of two parts, which are screwed together or held together in any other way. In this case the plug *e* is unnecessary. Fig. 4 shows a form in which the flexible spindle is made in one with the driving-shaft *f'*.

Having now particularly described and ascertained the nature of the said invention and in what manner the same is to be performed, I declare that what I claim is—

1. A flexible spindle having a hollow portion, and a rod located in the hollow portion and seated at opposite ends in the spindle to prevent the altering of the length of the spindle.

2. A spindle for centrifugal machines having a bearing portion, a hollow flexible portion, and a rod located in the hollow flexible portion and preventing the altering of the length of the spindle.

3. The combination with the drum; of a spindle secured to and supporting the weight of said drum and comprising a bearing portion, a flexible portion below said bearing portion and means for preventing the altering of the length of the spindle; a bearing for the spindle; and means for driving the spindle.

In testimony whereof I have signed my name to this specification in the presence of two subscribing witnesses.

IVAR PETER BAGGER KNUDSEN.

Witnesses:
AXEL DERUNIR,
MARCUS-MÓELER.